United States Patent [19]

Walter

[11] 4,186,147

[45] Jan. 29, 1980

[54] PROCESS FOR PREPARING ANILINE COMPOUNDS

[75] Inventor: Thomas J. Walter, Baton Rouge, La.

[73] Assignee: Ethyl Corporation, Richmond, Va.

[21] Appl. No.: 952,812

[22] Filed: Oct. 19, 1978

Related U.S. Application Data

[63] Continuation-in-part of Ser. No. 894,132, Apr. 6, 1978, abandoned, which is a continuation-in-part of Ser. No. 823,041, Aug. 9, 1977, abandoned.

[51] Int. Cl.$^2$ .............................................. C07C 87/28
[52] U.S. Cl. .................................................... 260/578
[58] Field of Search ......................................... 260/578

[56] References Cited

U.S. PATENT DOCUMENTS

| | | | |
|---|---|---|---|
| 4,006,183 | 2/1977 | Jackson | 260/578 X |
| 4,006,186 | 2/1977 | Engel et al. | 260/578 X |

OTHER PUBLICATIONS

Tanaka, "Bull. Chem. Soc. Japan", 44, pp. 2815-2820 (1971).
Tanaka, "Bull. Chem. Soc. Japan", 45, pp. 536-539 and 834-836 (1972).

*Primary Examiner*—Paul F. Shaver
*Attorney, Agent, or Firm*—Donald L. Johnson; John F. Sieberth; James M. Pelton

[57] ABSTRACT

Thioalkyl aniline compounds, useful as chemical intermediates, for example in the preparation of anthelmintic, antibacterial and fungicidal benzimidazole compounds, are prepared by reaction of thiocyano aniline compounds with an alcohol in the presence of an alkali metal cyanide and alternatively an alkyl halide together with a dipolar aprotic solvent; an alkyl halide together with a water-immiscible solvent, a phase transfer catalyst, and the use of aqueous alkali metal cyanide; or an alkyl halide, a water-immiscible solvent and a polymer bound phase transfer catalyst.

29 Claims, No Drawings

PROCESS FOR PREPARING ANILINE COMPOUNDS

CROSS-REFERENCE TO RELATED APPLICATION

This application is a Continuation-in-part of application Ser. No. 894,132, filed Apr. 6, 1978, which in turn is a Continuation-in-part of application Ser. No. 823,041, filed Aug. 9, 1977 both abandoned.

BACKGROUND OF THE INVENTION

This application relates to preparation of thioalkyl aniline compounds which are useful as intermediates in the preparation of anthelmintic, antibacterial and fungicidal agents. Recently, a number of patents have described anthelmintics of the benzimidazole type. Examples are U.S. Pat. Nos. 3,956,499, 3,915,986, 3,905,991, 3,682,952, Dutch patent application No. 7,506,095, British Pat. No. 1,424,773, etc. Despite the disclosures of these patents, the present method for the preparation of such intermediates useful in such applications have not been heretofore disclosed.

In the prior art there are shown methods for preparing certain thioalkyl aniline compounds, such as the ortho-chlorophenyl thiocyanate, by reacting with n-propanol in the presence of sodium cyanide. However, a yield of only 29% was obtained. When the same reaction is repeated in dimethyl sulfoxide, the yield is increased to 50%; Tanaka, "Bulletin of the Chemical Society of Japan", Vol. 44, pages 2815–2820 (1971). The reaction of diaryl disulfides is also discussed by Tanaka in the same publication at Vol. 45, pages 536–539 (1972) in which the mechanism of the reaction is studied in some detail. Further elucidation of the mechanism of the initially described reaction between aryl thiocyanates, alcohol and cyanide is given by Tanaka in the same journal at Vol. 45, pages 834–836 (1972) in which thioiminocarbonates were produced in good yields. However, the production of thioalkyl anilines nevertheless could be improved by processes increasing the yields and allowing for recycle and reuse of expensive reagents. The present invention provides such improved process aspects.

SUMMARY OF THE INVENTION

This invention has at least three aspects by which improved methods for preparing 4-thioalkyl aniline compounds are provided. In one aspect, this invention includes an improved process for preparing thioalkyl aniline compounds by reacting a thiocyano aniline compound with an alcohol in the presence of an alkali metal cyanide and a dipolar aprotic solvent, the improvement comprising the additional presence of an alkyl halide reactant which surprisingly enhances the yield of thioalkyl aniline. In another aspect of the present invention, thioalkyl aniline compounds are produced by reacting a thiocyano aniline with an alcohol and an alkyl halide in the presence of an aqueous alkali metal cyanide, a water-immiscible solvent and a phase transfer catalyst. Preferably the phase transfer catalyst has the general formula (R)₄MX in which at least one R group is a lower alkyl group and the remaining R groups are selected from alkyl groups having from 2 to 20 carbon atoms, benzyl groups, phenyl groups or monolower alkyl substituted benzyl or phenyl groups, M is selected from nitrogen, phosphorus, arsenic, antimony and bismuth and X is a halogen, such as chlorine, bromine or iodine, a hydroxyl or bisulfate group.

In another aspect of this invention, the phase transfer catalyst is replaced with a polymer bound phase transfer catalyst.

DETAILED DESCRIPTION OF PREFERRED EMBODIMENTS

The thioalkyl aniline compounds produced by the process of this invention can employ an alkyl group having from 1 to about 4 carbon atoms. Preferably, such compounds employ hydrocarbyl groups, i.e., groups composed of only carbon and hydrogen, in the structure of the alkyl group. Accordingly, groups such as methyl, ethyl, propyl, isopropyl, butyl and isobutyl groups can be used in the thioalkyl or thiohydrocarbyl aniline compounds of the present invention.

Additionally, the aromatic ring of such thioalkyl or thiohydrocarbyl aniline compounds can have such substituents as halo, nitro, amino and similar functional groups substituted on the benzene ring nucleus in the 2, 3, 5 or 6 position, positions 1 and 4 being reserved for the amino and thio groups, respectively.

Therefore, the compounds produced by the process of this invention can be 4-thiomethyl-2-nitroaniline, 4-thioethyl-2-nitroaniline, 4-thiopropyl-2-nitroaniline, 4-thiobutyl-2-nitroaniline, 4-thiopropyl-3-nitroaniline, 4-thioethyl-3-chloroaniline, 4-thiobutyl-5-nitroaniline, 4-thiomethyl-6-nitroaniline, 4-thioethyl-2-bromoaniline, 4-thiopropyl-3-aminoaniline, and the like. Of course, as indicated hereinabove, other groups which are innocuous to the cyanide displacement can be substituted for the nitro group in the same or different positions. Most preferred of the compounds produced by the present process is 4-thiopropyl-2-nitroaniline because of its use as an intermediate in the synthesis of effective anthelmintics.

The above compounds are prepared by reaction of 4-thiocyano aniline compounds which are known intermediates for antibacterial compounds with an alcohol or other source of alkyl groups suitable for the formation of compounds of this invention in the presence of an equivalent of an alkali metal cyanide.

In the present invention, the alcohol employed is one source of hydrocarbyl groups or alkyl groups in the thioalkyl or thiohydrocarbyl aniline compounds produced by the present process. Thus, methanol, ethanol, n-propanol, isopropanol, n-butanol and the like may be used. As another source of alkyl or hydrocarbyl groups, there may be mentioned alkyl halides. For example, alkyl chloride and alkyl bromide, such as methyl chloride, ethyl bromide, n-propyl chloride, n-propyl bromide, n-propyl iodide, n-butyl chloride, n-butyl bromide, and the like are useful. Any of the halides can be employed so long as no substantially adverse reaction with starting materials, intermediates or product is evidenced; although propyl bromide and propyl chloride are preferred because of good results and low cost. Most efficacious has been the combination of alcohol and alkyl halide. Any of the foregoing alcohols and alkyl halides can be used in about any relative amount. However, best results have been achieved when about molar equivalent quantities are employed. Most preferably, there is employed n-propanol with n-propyl bromide. Most highly preferred is the use of propanol and propyl bromide in molar equivalent ratios.

It has also been found that a bipolar aprotic solvent is effective to facilitate dissolution of the alkali metal cyanide into the reaction mixture. Many such solvents are known and commercially available. As examples, there may be mentioned dimethyl sulfoxide, dimethyl formamide, hexamethyl phosphoramide, etc. Any of these which does not interfere with the reaction and easily accomplishes dissolution of the alkali metal cyanide into the reaction mixture can be used.

Although dipolar aprotic solvents provide advantageous process results, they suffer from the disadvantages of being expensive, high boiling and water soluble which makes product recovery and solvent recycle difficult. Therefore, an alternative process of this invention includes a process for preparing a thioalkyl aniline by reacting a thiocyano aniline with an alcohol and an alkyl halide in the presence of an aqueous alkali metal cyanide, a water-immiscible solvent and a phase transfer catalyst. Catalysts useful in the process of the present invention are, in general, any compound having the general formula (R)$_4$MX which provides in the reaction system the ion "(R)$_4$MX$^\oplus$", where M is a Group V-A element of Periodic Chart of the Elements, Fisher Scientific Company, Chicago, Ill., 1955 (nitrogen, phosphorus, arsenic, antimony, or bismuth); one, two or three of the R groups are lower alkyl having from 1 to about 4 carbon atoms, benzyl or phenyl, or mono- lower alkyl-substituted benzyl or phenyl; each of the other R groups is alkyl having from 2 to about 20 carbon atoms, benzyl or phenyl; and wherein X is a chlorine, iodine or bromine atom or a hydroxy or bisulfate group. Preferred (R)$_4$MX compounds are those wherein the total number of carbon atoms in the (R)$_4$ portion are from about 10 to about 30, preferably from about 12 to about 20, or from about 12 to about 16, especially those wherein the R groups are acyclic groups. Preferred compounds are the ammonium or phosphonium compounds. Suitable phenyl groups are unsubstituted or substituted with compatible substituents which do not react adversely in the system. Preferably, the substitution on the phenyl groups is limited to that containing only hydrogen and carbon atoms such as lower alkyl groups having from 1 to about 4 carbon atoms, particularly methyl, ethyl, propyl or butyl groups. Typical catalyst compounds include tributyl methyl ammonium chloride [13 carbon atoms in the (R)$_4$ portion], tributyl methyl phosphonium chloride, tributyl methyl ammonium iodide, tributyl methyl phosphonium bromide, tributyl methyl ammonium hydroxide, tributyl ethyl ammonium iodide [14 carbon atoms in the (R)$_4$ portion], tributyl ethyl ammonium bromide, tributyl ethyl ammonium chloride, tributyl methyl arsenic chloride, tributyl methyl antimony chloride, tributyl methyl bismuth chloride, dodecyltrimethyl ammonium chloride, didecyldimethyl ammonium chloride, tetraphenyl ammonium chloride and the like. Other suitable catalysts are tripropyl butyl ammonium chloride, tripropyl butyl ammonium bromide, tripropyl butyl ammonium iodide and the like. Other suitable catalysts are tripropyl pentyl ammonium chloride, tripropyl pentyl ammonium bromide, tripropyl pentyl ammonium iodide and the like. Other suitable catalysts are tripropyl hexyl ammonium chloride, tripropyl hexyl ammonium bromide, tripropyl phenyl ammonium chloride, dipropyl methyl ethyl ammonium chloride, dimethyl ethyl phenyl ammonium chloride, tripropyl phenyl ammonium iodide, tributyltetradecyl phosphonium bromide (Bu$_3$C$_{14}$H$_{29}$PBr) and the like.

The phase transfer catalyst provides reaction at the interface between reactants in the aqueous phase and the organic phase. The organic phase may be provided in a water-immiscible solvent. For reactions of this type it has been found that a halohydrocarbon solvent provides good water immiscibility, substantial inertness to reactants and products and good stability at reaction temperatures. Preferred halohydrocarbon solvents have a boiling point greater than about 20° C. at atmospheric pressure to provide good agitation during reaction, such as by refluxing. Typical of such water-immiscible solvents are methylene chloride, chloroform, chlorobenzene, trichloroethylene, perchloroethylene, and the like. Most preferred is methylene chloride because of its availability and utility.

In another aspect of the process of this invention, it has been found that recovery of the catalyst, recycle to subsequent reactions and easily handled product solutions are advantageously obtained when the phase transfer catalyst is immobilized or bound to a solid substrate, such as a polymer which is not dissolved in either the aqueous or organic phase. Such a most highly preferred catalyst while maintaining yields equivalent to soluble phase transfer catalysts, do not become inactivated when chemically attached to the polymer substrate, are not lost during separation of the phases and are easily recovered for clean-up and recycle. For convenience, such catalysts will be referred to as polymer-bound phase transfer catalysts. The polymer portion of polymer-bound phase transfer catalyst is the organophillic portion and provides a solid substrate upon which the hydrophilic active portion of the polymer-bound phase transfer catalyst is attached. Any polymer, including copolymers, ternary polymers and the like can be employed providing they have the porosity, handling ability, physical integrity during reaction to form the phase transfer catalyst and chemical properties. Preferably, it has been found that a chloromethylstyrenedivinyl benzene copolymer, commercially available from Bio-Rad Laboratories, Richmond, Calif., under the tradename "Chloromethyl Biobeads" provides a suitable substrate for the preparation of the polymer-bound phase transfer catalyst used in the process of this invention. The above mentioned copolymer is reacted with, among others, a tertiary amine to form the polymer-bound phase transfer catalyst. Such tertiary amines, as are suitable in the formation of the quaternary salt catalysts of formula (R)$_4$MX described hereinabove, are useful for the preparation of the polymer-bound phase transfer catalyst. For example, tertiary alkyl amines having from 1 to about 20 carbon atoms in one or more of the alkyl groups, or benzyl or phenyl groups in the tertiary amine are useful. Preferably, each alkyl group has from 1 to about 12 carbon atoms and, more preferably, from 1 to about 4 carbon atoms in each alkyl group. Typical examples are trimethyl amine, triethyl amine, tripropyl amine, tributyl amine and the like, all as hereinbefore mentioned with respect to the quaternary salt catalyst. Preferred examples of such amines are N,N-dimethyl-n-butyl amine and tri-n-butyl amine.

The polymer-bound phase transfer catalysts useful in this invention can be prepared according to the method of Regen, *J. Org. Chem.*, Vol. 42, No. 5, 1977, pp. 875–879.

The polymer-bound pahse transfer catalyst used in the process of this invention was prepared by saoking the "Chloromethyl Biobeads" in tetrahydrofuran until swollen. Then, a 50 to 100 percent molar excess of the N,N-dimethyl-n-butylamine was added and the reaction mixture was refluxed for 12 hours. The solids were filtered off, washed and dried overnight. The polymer-bound phase transfer catalyst was then ready for use as shown in Example 10.

The amount of catalyst used is, in general, an effective amount ot achieve at least some catalytic effect; however, in general, one does not use more catalyst than is necessary to achieve a reasonable reaction rate since such usually involves the monopolization of reactor volume, needless expense and the like. In general, the amount of catalyst used ranges from about 0.1 to about 10 mol percent based on the 4-thiocyano-2-nitroaniline reactant with from about 1 to about 5 percent being preferred. Preferred catalysts contain a total of from about 12 to about 16 carbon atoms total in the R groups, especially those in which all R groups are not the same, since several such catalysts have an excellent relationship between the solubilities thereof in the reaction system as well as in water wash systems useful to remove catalyst residue from the product. Other criteria considered in the selection of catalysts include initial cost and ease of preparation. Outstanding catalysts are tetrabutyl ammonium bromide and tributyl methyl ammonium chloride, since they are readily prepared by a comparatively easy process known conventionally to one skilled in the art.

In each type of reaction alternatively described hereinabove, an alkali metal cyanide is employed. Preferably, the alkali metal cyanide is sodium or potassium cyanide. In the reactions employing a dipolar aprotic solvent the alkali metal cyanide is used per se, but when a phase transfer catalyst is employed the alkali metal cyanide may be an aqueous alkali metal cyanide.

The process for preparing the intermediates can be best illustrated by reference to a specific example. Since 4-thiopropyl-2-nitroaniline is typical of such intermediates, it will be used to illustrate the process for preparation of such useful compounds in the following examples.

EXAMPLE 1

A 0.40 g portion of powdered sodium cyanide was dissolved in a solution of 2.93 g of n-propanol and 8 ml of dimethylsulfoxide. Then, to the reactor was added 1.56 g of 4-thiocyano-2-nitroaniline and the reaction mass was stirred at room temperature. Another 0.4 g of powdered sodium cyanide was added after 105 minutes and dissolved into the reaction mass. Then, 145 minutes after the start of the reaction, 5 ml of propyl bromide was added to the reaction mixture which became thick and formed a porous solid so that the agitator blade was prevented from stirring. An additional 10 ml of dimethyl sulfoxide solvent was added. Workup of the reaction mixture by adding methylene chloride and extracting three times with water, followed by drying over sodium sulfate, showed the yield to be 98.6% of desired 4-thiopropyl-2-nitroaniline as determined by vapor phase chromatograph with internal standard.

EXAMPLE 2

Following the procedure of Example 1, except that propyl chloride and dimethyl formamide are used in place of propyl bromide and dimethyl sulfoxide. There was added 0.62 g of propanol, 0.81 g of propyl chloride and 0.122 g of biphenyl as an internal standard in dimethyl formamide. A 0.26 g portion of solid sodium cyanide was added to the solution and then 1 g of 4-thiocyano-2-nitroaniline was added to the reaction mixture which was stirred at room temperature. After 45 minutes, a sample analyzed by vapor phase chromatography showed 58% yield of 4-thiopropyl-2-nitroaniline. A yield of 67% 4-thiopropyl-2-nitroaniline was obtained in a sample analyzed by vapor phase chromatography after 1 hour and 15 minutes. Then, an additional 1.21 g of propyl chloride was added to the reaction mixture to hasten reaction. One hour later, a 71% yield of 4-thiopropyl-2-nitroaniline was determined by vapor phase chromatography.

EXAMPLE 3

A 0.30 g portion of powdered sodium cyanide was dissolved in a solution of 1.85 g of n-propanol in 10 ml of dimethyl sulfoxide. A 0.119 g portion of biphenyl was added as an internal standard to follow the reaction progress. Then, 4-thiocyano-2-nitroaniline in the amount of 1 g was added and the reaction mixture was stirred at room temperature. After 15 minutes from completion of the addition, the yield of 4-thiopropyl-2-nitroaniline was 27%. After one hour the yield was 31%. Since product formation had nearly stopped, 3.78 g of n-propyl bromide was added to the reaction mixture. Forty-five minutes later the yield of 4-thiopropyl-2-nitroaniline was 75%.

EXAMPLE 4

A 1 g portion of 4-thiocyano-2-nitroaniline, 0.16 g of tetrabutyl ammonium bromide as a catalyst, 0.117 g of biphenyl, 1.86 g of n-propanol, and 3.79 g of n-propyl bromide were dissolved in 10 ml of refluxing methylene chloride. To the refluxing reaction mixture was then added a 1.56 g portion of sodium cyanide as 6.16 g of a 25% aqueous solution. The reaction mixture was refluxed using a 50° C. oil bath and moderate agitation. The reaction mixture turns a burgundy red after one or two minutes. The following time-yield relationship was observed by taking samples and analyzing by vapor phase chromatography.

| Time (Min.) | 4-Thiopropyl-2-nitroaniline (% Yield) |
| --- | --- |
| 30 | 59 |
| 105 | 85 |
| 150 | 92 |
| 215 | 93 |

The reaction was stopped and the layers separated without emulsions. The organic layer was dried and the solvent evaporated on a rotary evaporator to obtain the crude product.

EXAMPLE 5

The procedure of Example 4 was followed except that n-propyl bromide was replaced by 2.42 g of n-propyl chloride and 0.102 g of biphenyl were employed as the internal standard. After addition of all the reagents in the same amounts as Example 4, with the exceptions noted above, the reaction mixture forms an orange precipitate. After 1 hour and 15 minutes, the yield of product 4-thiopropyl-2-nitroaniline is 18%. After 160 minutes, the yield 4-thiopropyl-2-nitroaniline was only 20%. A solid was separated from the reaction mixture and was not further characterized.

EXAMPLE 6

A 1 g portion of 4-thiocyano-2-nitroaniline, 0.16 g of tetrabutyl ammonium bromide, 1.865 g of n-propanol and 3.791 g of n-propyl bromide was dissolved in 10 ml of refluxing methylene chloride. Then, 0.114 g of biphenyl was added as an internal standard to follow the reaction via vapor phase chromatograph. A 6 g portion of 25.3% aqueous sodium cyanide (1.51 g of sodium cyanide) was added to the reaction mixture. The reaction mixture was refluxed on an oil bath at 50° C. with moderate agitation. The yield of 4-thiopropyl-2-nitroaniline was followed during the course of the reaction and after 30 minutes the yield of 4-thiopropyl-2-nitroaniline was 68.4%. After 2 hours, the yield was 91.1%. The reaction was stopped after 3 hours and 10 minutes and the yield was 87.7%.

EXAMPLE 7

This example is similar to Example 6, except that 1 mole % of the catalyst tetrabutyl ammonium bromide based on the starting 4-thiocyano-2-nitroaniline is employed. A 1 g portion of 4-thiocyano-2-nitroaniline, 0.016 g of tetrabutyl ammonium bromide, 1.86 g of n-propanol, 0.114 g of biphenyl and 3.79 g of n-propyl bromide were dissolved in 10 ml of refluxing methylene chloride. Then, 6 g of 25.3% aqueous sodium cyanide (containing 1.51 g of sodium cyanide) was added to the reactor. The reaction mixture was refluxed using a 50° C. oil bath and moderate agitation. The reaction progress was followed on the vapor phase chromatograph with the following results:

| Reaction Time After Addition (hrs.) | 4-Thiopropyl-2-nitroaniline % Yield |
| --- | --- |
| 0.5 | 7 |
| 1 | 19 |
| 2 | 40 |
| 3 | 54 |
| 5 | 72 |
| 5.75 | 61 |

Trouble was experienced with the vapor phase chromatograph columns. On changing the columns, the final yield of a sample of this experiment was 85% of 4-thiopropyl-2-nitroaniline.

EXAMPLE 8

This experiment is similar to Example 6, except that 1 mol % of methyl tributyl ammonium chloride catalyst based on 4-thiocyano-2-nitroaniline is employed. The reagents as in Example 7 were used except that 0.131 g of biphenyl was added as an internal standard and 0.012 g of the methyl tributyl ammonium chloride was employed instead of the tetrabutyl ammonium bromide. Following the same procedure as in Example 7, the following readings were made by the vapor phase chromatograph with time:

| Time (Hrs.) | 4-Thiopropyl-2-nitroaniline % Yield |
| --- | --- |
| 1 | 24 |
| 2 | 42 |
| 4 | 64 |
| 5 | 72 |
| 6 | 77 |

EXAMPLE 9

A 2 g portion of 4-thiocyano-2-nitroaniline, 0.16 g of a 75 wt % aqueous solution of methyl tributyl ammonium chloride (equivalent to 5 mol % based on the 4-thiocyano-2-nitroaniline), 3.72 n-propanol and 7.58 g of n-propyl bromide was dissolved in 20 ml of refluxing methylene chloride. A 12 g portion of 25.3 wt % aqueous sodium cyanide (3.04 g of sodium cyanide) was added. The reaction mixture was refluxed using 50° C. oil bath and moderate agitation. The reaction was stopped after 4 hours and the phases were separated. High pressure liquid chromatographic (HPLC) analysis determined a yield of 97% of 4-thiopropyl-2-nitroaniline.

In a separate experiment under identical conditions, a 97% yield of 4-thiopropyl-2-nitroaniline was determined using the internal standard vapor phase chromatographic analysis method.

The product can be purified by column chromatography and recrystallized from toluene-hexane solvent mixture. The orange needles of 4-thiopropyl-2-nitroaniline melt at 36.5°–38° C. Infrared and NMR analysis confirm the structure. Alternatively, the product can be purified so as to recycle the aqueous phase and recover unreacted n-propanol, n-propyl bromide and methylene chloride. This involves an initial phase separation followed by flash of the methylene chloride and unreacted n-propanol and n-propyl bromide.

EXAMPLE 10

A flask was charged with 1.0 g of 4-thiocyano-2-nitroaniline, 6.0 g of an aqueous solution containing 25% sodium cyanide, 10 ml of methylene chloride, 0.22 g of polymer-bound phase transfer catalyst, prepared as described hereinabove, containing 1.19 meq. of quaternary nitrogens per gram of catalyst, 1.85 g of n-propanol, 3.78 g of n-propyl bromide, and 0.105 g of biphenyl as an internal standard. The stirred reaction mixture was placed in a 50° C. oil bath for 6 hours. The catalyst was filtered and washed with methylene chloride. The methylene chloride layer was separated from the aqueous layer and analyzed by gas chromatography. The yield of 4-thiopropyl-2-nitroaniline was 89%.

The process is not limited to a tetrabutyl ammonium bromide, methyl tributyl ammonium chloride or polymer-bound phase transfer catalyst. Any compound known for this type of activity can be used. Many phase transfer catalysts are effective, such as the ammonium or phosphonium salts known to skilled practioners to be effective as phase transfer catalysts. Similarly, solvents other than methylene chloride can be used. Further, the reaction temperature can be varied. Additionally, reaction times can be decreased by running the above reaction in an appropriate pressure vessel at pressures greater than atmospheric pressure. Reaction times can also be increased or decreased, depending on catalyst concentration.

Having described several aspects of the present invention, one skilled in the art can envision many variations and alternatives within the scope of the present invention. Therefore, it is desired that the invention be limited only by the lawful scope of the following claims.

What is claimed is:

1. In a process for preparing a thioalkyl-aniline by reacting a thiocyano aniline and an alcohol in the presence of an alkali metal cyanide and a dipolar aprotic solvent, the improvement comprising conducting said reaction in the additional presence of an alkyl halide.

2. The process of claim 1 in which said thioalkylaniline is a nitro aniline.

3. The process of claim 1 in which said thioalkylaniline is a 4-thioalkyl-aniline.

4. The process of claim 1 in which said thioalkylaniline is 4-thioalkyl-2-nitro aniline.

5. The process of claim 1 in which said alkyl halide is an alkyl bromide or an alkyl chloride 6. The process of claim 1 in which said alkyl halide is propyl bromide or propyl chloride.

7. The process of claim 1 in which said alcohol was from 1 to 4 carbon atoms.

8. The process of claim 1 wherein said dipolar aprotic solvent is selected from dimethyl sulfoxide, dimethyl formamide or hexamethyl phosphoramide.

9. The process of claim 1 in which said alkali metal cyanide is sodium cyanide or potassium cyanide.

10. The process of claim 1 in which said thioalkylaniline is 4-thioalkyl-2-nitro aniline, said alcohol is propanol, said alkyl halide is propyl bromide and said dipolar aprotic is dimethyl sulfoxide.

11. A process for preparing a thioalkyl-aniline by reacting a thiocyano aniline with an alcohol and an alkyl halide in the presence of an aqueous alkali metal cyanide, a water-immiscible solvent and a phase transfer catalyst.

12. The process of claim 11 in which said thioalkylaniline is a nitro aniline.

13. The process of claim 11 in which said thioalkylaniline is a 4-thioalkyl-aniline.

14. The process of claim 11 in which said thioalkylaniline is 4-thioalkyl-2-nitro aniline.

15. The process of claim 11 in which said alkyl halide is an alkyl bromide or an alkyl chloride.

16. The process of claim 11 in which said alkyl halide is propyl bromide or propyl chloride.

17. The process of claim 11 in which said alcohol is methanol, ethanol, propanol or butanol.

18. The process of claim 11 wherein said alkali metal cyanide is aqueous potassium cyanide or aqueous sodium cyanide.

19. The process of claim 11 wherein said water-immiscible solvent is a halohydrocarbon having a boiling point greater than about 20° C. at atmospheric pressure and which is substantially inert to the reactants and products.

20. The process of claim 11 wherein said water-immiscible solvent is methylene chloride.

21. The process of claim 11 wherein said phase transfer catalyst is a compound having the general formula $(R)_4MX$ in which M is a member of the group selected from nitrogen, phosphorus, arsenic, antimony and bismuth, at least one R group is a lower alkyl group and the remaining R groups are alkyl groups having from 2 to about 20 carbon atoms, benzyl or phenyl groups, or mono- lower alkyl-substituted benzyl or phenyl groups and X is a halogen selected from chlorine, bromine or iodine, or a hydroxy or bissulphate group.

22. The process of claim 21 wherein in said general formula M is a nitrogen atom and X is a halide group.

23. The process of claim 21 wherein said phase transfer catalyst is a tetra alkyl ammonium halide.

24. The process of claim 21 wherein said phase transfer catalyst is selected from tetra-n-butyl ammonium bromide, methyl tri-n-butyl ammonium bromide and methyl tri-n-butyl ammonium chloride.

25. The process of claim 11 wherein said phase transfer catalyst is a polymer bound phase transfer catalyst.

26. The process of claim 11 wherein said phase transfer catalyst is a polymer bound phase transfer catalyst in which the polymer is a chloromethyl styrene polymer crosslinked with 1 to about 10% of divinylbenzene.

27. The process of claim 11 wherein said phase transfer catalyst is a polymer bound phase transfer catalyst which is the reaction product of tetrahydrofuran swollen, 1% divinylbenzene-crosslinked chloromethyl styrene with a tertiary amine.

28. The process of claim 27 in which the tertiary amine has from two to three alkyl groups composed of hydrocarbyl groups having 1 to 20 carbon atoms with the remaining groups, if any, being benzyl or phenyl or mono-lower alkyl-substituted benzyl or phenyl groups.

29. The process of claim 11 in which said phase transfer catalyst is a polymer bound phase transfer catalyst which is the reaction product of tetrahydrofuran swollen, 1% divinylbenzene-crosslinked chloromethyl styrene with a tertiary amine selected from N,N-dimethyl-n-butyl amine or tri-n-butyl amine.

* * * * *